Dec. 30, 1947.  M. A. BORDELON  2,433,336
MANUALLY OPERATED OVERRUNNING CLUTCH
Filed Oct. 4, 1945

INVENTOR
Madel A. Bordelon
By M. A. Hayes
ATTORNEY

Patented Dec. 30, 1947

2,433,336

UNITED STATES PATENT OFFICE 2,433,336

MANUALLY OPERATED OVERRUNNING CLUTCH

Madel A. Bordelon, Moreauville, La.

Application October 4, 1945, Serial No. 620,379

9 Claims. (Cl. 192—47)

(Granted under the act of March 3, 1883, as amended April 30, 1928; 370 O. G. 757)

This invention relates to clutch devices and particularly to an improved controlled one-way clutch for operatively coupling drive and driven members.

An important object of this invention is to provide an improved clutch device which is controllable by the operator for engaging or disengaging the drive and driven members. Another object of this invention is to provide a novel snap action control for a one-way clutch which positively locks or unlocks the drive and driven members, and in the case of belt drives eliminates the need of removing the belt to cut off power delivery to other machinery. A further object of the invention is to provide such a clutch device which is easily installed and removed from drive shafts, is compact and light weight, and consists of few parts easily manufactured and assembled. A meritorious feature of the invention is the fact that the snap action control is unobtrusively mounted on the clutch device and is operable by finger pressure to either engaged or disengaged positions.

Figure 1:
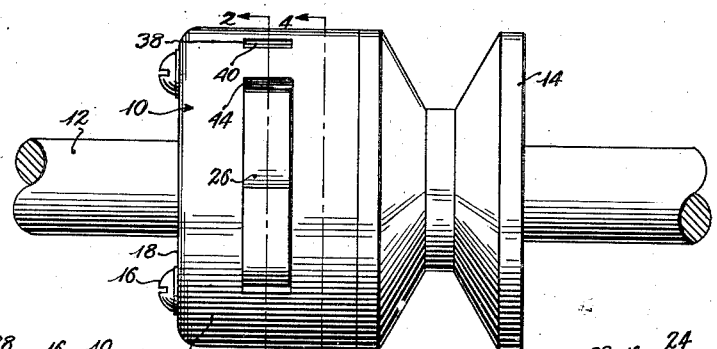
Figure 2:
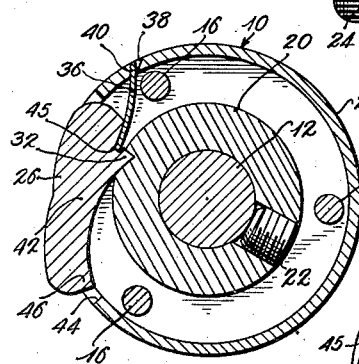
Figure 3:
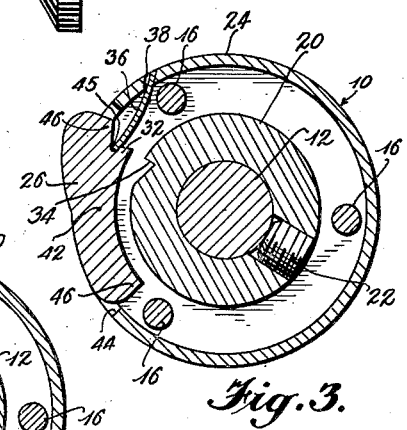
Figure 4:
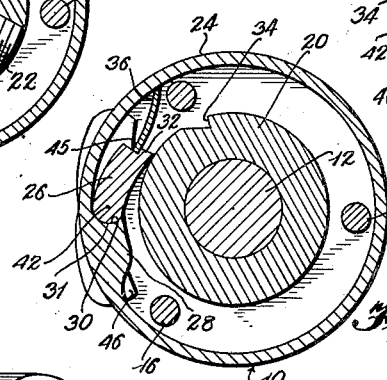
Figure 5:
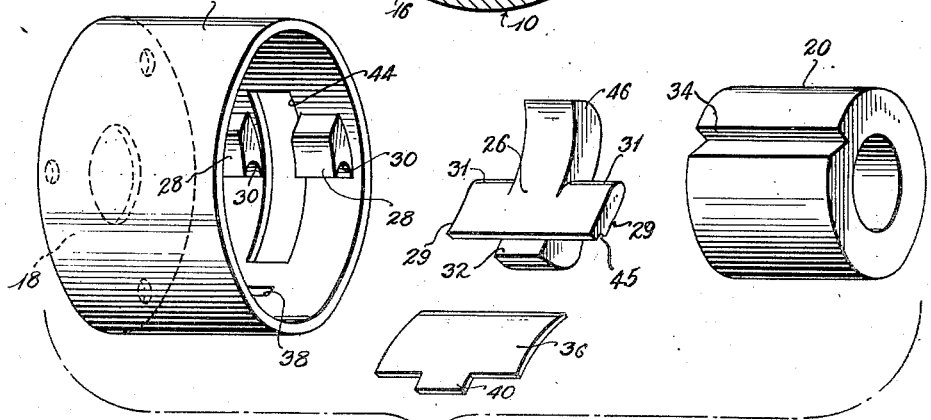

Various other objects, advantages and meritorious features of the invention will become more fully apparent from the following specification, appended claims and accompanying drawings wherein:

Fig. 1 is a view in elevation of a clutch device embodying this invention,

Fig. 2 is a cross sectional view along lines 2—2 of Fig. 1 showing the device in clutch engaging position, Fig. 3 is a similar cross sectional view showing the device in clutch disengaging position, Fig. 4 is a cross sectional view along lines 4—4 of Fig. 1 showing the pivotal mounting of the clutch engaging pawl, and Fig. 5 is an exploded view of the device showing the parts in disassembled condition.

Although the invention is capable of many uses, it is herein described applied to a drive shaft from which power is taken for driving other machines by means of an endless belt. In Fig. 1, a clutch device embodying this invention is shown generally at 10 mounted upon the drive shaft 12. Associated with the clutch device is a sheave or pulley 14 from which an endless belt may run for driving other machines. The sheave is secured to the side of the clutch in any suitable manner such as by the provision of screws 16 which extend through the clutch housing from the side 18 thereof to the pulley.

Referring in detail to the remaining figures, the clutch device comprises a drive member in the form of a collar 20 removably fixed to the shaft 12 by means of a set screw 22, and a driven member, the major portion of which consists of a sleeve 24 concentrically encircling the drive member. The inside radial dimension of the sleeve is such that an annular space is formed between the drive member and the sleeve. In assembled condition the collar member 20 is housed inside the sleeve between the side wall 18 thereof and the sheave 14 and has a longitudinal dimension extending substantially the distance therebetween as is apparent in Fig. 5.

Located in the annular space between the drive and driven members is a detent or pawl 26 which is mounted on the sleeve for movement inwardly toward the drive member for engagement therewith or outwardly away therefrom. This is accomplished in the present embodiment of the invention by providing arcuate bearing surfaces on the inside periphery of the sleeve in the form of two spaced bosses 28—28 having arcuate seats 30—30 therein. The pawl is provided with two lateral extensions 29—29 having arcuate or rounded edges 31—31 which engage in the arcuate seats 30—30 and it is evident that the opposite free end 32 of the pawl is capable of swinging movement inwardly toward the drive member and outwardly away therefrom. Means in the form of longitudinal notch 34 on the peripheral surface of the driving collar 20 is provided for engaging the free end of the pawl as shown in Fig. 2 and thereby coupling the drive and driven members together for joint rotation.

Novel means is provided for releasably holding the pawl in either engaged or disengaged positions as shown in Figs. 2 and 3 respectively. This means in the illustrative embodiment of the invention herein comprises a single flexible metallic blade 36 having one end fixed to the sleeve and the other end in continuous engagement with the free end of the pawl. To secure the fixed end of the blade to the sleeve, a narrow slot 38 is cut thereinto and the blade as shown in Fig. 5 is provided with a tongue 40 which enters this slot and holds this end of the blade in place. The opposite end of the blade is received in a small recess 45 just above the engaging end 32 of the pawl. The length of the blade is such that it is flexed or bowed slightly to set the blade between the support on the sleeve and the free end of the pawl and it retains this bowed state in all positions of its operation.

In order to obtain the desired holding action of the spring blade 36, the pawl engaging end of the blade is swung through the imaginary line or plane joining the pivotal axis indicated at 42 and the slot 38 in which the tongue 40 of the blade is received. When the pawl engaging end of the blade is inside this line or plane, it exerts a resilient pressure on the pawl toward the drive member. Conversely, when the pawl engaging end of the blade is outside this line or plane, a resilient pressure is exerted on the pawl tending to force it away from the drive member. Thus by moving the pawl through this plane, it is either urged toward or away from the drive member depending upon which side of the plane the pawl engaging end of the blade is disposed. Although the blade is bowed in the same way for all positions of the pawl, it is understood that the direction in which it urges the pawl is determined by the side of the plane the pawl engaging end of the blade is located. For example, in the disengaged position in Fig. 3, the blade urges the pawl outwardly away from the driven member by virtue of the fact that the end of the blade engaging the pawl is to the left of the plane and exerts a force tending to rotate the pawl counterclockwise about its pivotal axis. Swinging movement of the pawl in this counterclockwise direction is limited by abutment of the pawl with the inside peripheral surface of the sleeve. The blade operates with an audible snap when the pawl is swung across the plane to either its engaged or disengaged position and it is evident the blade will releasably hold the pawl in either of these two positions.

An important feature of the invention is the provision for controlling the operation of the pawl from the outside of the clutch device. This is accomplished in the illustrative embodiment of the invention herein by the provision of an opening in the side of the sleeve in the form of a circumferentially elongated slot 44 which overlies the pawl 26. Manual control means for operating the pawl extends through this slot. As shown, this means is in the form of an elongated member 46 having a length and width such that it occupies substantially the whole area of the slot 44. Although this member may be a separate element operatively connected to the pawl, it is preferred for manufacturing and assembling reasons that it form an integral part of the pawl as illustrated in Fig. 5. The slot 44 is so located on the sleeve that it extends on either side of the pivotal axis 42 and preferably an equal distance on either side thereof. The control member 46 occupying the entire area of the slot is similarly disposed with respect to the pivotal axis. As a result, since the member 46 forms an integral part of the pawl it is capable of rocking movement about the pivotal axis in timed relation to the swinging movement of the pawl. The control member 46 protrudes through the slot to the outside of the clutch device and finger pressure is sufficient to rock the same against the resistance of the spring blade 36.

Since the clutch device may be installed in relatively inaccessible poorly lighted places or in crowded machinery conditions, it is preferred that the control member have its exterior finished so that when rocked about the axis only one or the other end of the member protrudes a slight distance above the outside peripheral surface of the sleeve in either of the two positions of the pawl. As shown by comparison of Figs. 2 and 3, the outside exposed surface of the control member is divided transversely into two curved sections each of which becomes flush with the periphery of the sleeve in its depressed position. Thus an operator reaching for the device to control its operation can readily find the section of the control member upon which to exert pressure in order to snap the pawl into either engaged or disengaged position.

If it is desired to convey power from the driving shaft in the opposite direction, the clutch device is readily removed from the drive shaft and reinstalled in reversed position. To get proper alignment with other equipment, the clutch device may be slidably adjusted along the drive shaft and fixed in the desired position by the set screw 22.

While I have described the preferred form of my invention I do not wish to limit myself to the precise details as shown but wish to avail myself of such variations and modifications as may come within the scope of the appended claims.

The invention described herein may be manufactured and used by or for the Government of the United States of America for governmental purposes without the payment of any royalties thereon or therefor.

I claim:

1. A one-way clutch device comprising in combination, a rotatable driving member, a rotatable driven member concentrically encircling said driving member and having an inside radial dimension such that an annular space is formed between the two members, a pawl carried by said driven member in said annular space and mounted for movement inwardly toward and outwardly away from said driving member, means carried by said driving member adapted to engage said pawl in its inward position and thereby rotate said driving member therewith, said driven member having an opening therethrough adjacent said pawl, means carried by said pawl extending through said opening to the outside of the device and operable to shift the pawl either toward said driving member for engagement therewith or away therefrom to disengaged position, and means in said annular space releasably holding said pawl in either engaged or disengaged position.

2. A clutch device comprising, in combination, a drive member, a driven member having a sleeve portion concentrically encircling the drive member and having an inside radius such that an annular space separates the sleeve portion from the driving member, a pawl in said annular space, a boss on the inside peripheral surface of said sleeve portion forming a pivot for one end of said pawl permitting the free end thereof to swing inwardly toward the drive member or away therefrom, means on said drive member adapted to engage the free end of said pawl when the latter is swung inwardly thereto and thereby couple the driven member for joint rotation therewith, said sleeve portion of the driven member having an opening through the side thereof adjacent to said pawl permitting access thereto for moving the pawl to either engaged or disengaged position, and a single flexible blade fixed at one end to said sleeve portion and having its other end engaging said free end of the pawl and adapted to releasably hold the same in either engaged or disengaged position.

3. A clutch device comprising, in combination, a drive member, a driven member having a sleeve portion concentrically encircling the drive member and having an inside radius such that an annular space separates the sleeve portion from the driving member, a pawl in said annular space, a boss on the inside peripheral surface of said sleeve portion forming a pivot for one end of said pawl permitting the free end thereof to swing inwardly toward the drive member or away therefrom, means on said drive member adapted to engage the free end of said pawl when the latter is swung inwardly thereto and thereby couple the driven member for joint rotation therewith, said sleeve portion of the driven member having an opening through the side thereof adjacent to said pawl, a single flexible blade fixed at one end to said sleeve portion and having its other end engaging said free end of said pawl, said blade acting to releasably hold said pawl in either engagement with said driving member or away therefrom in disengaged position, and manual control means extending through said opening and operable to swing said pawl to either engaged or disengaged positions.

4. A clutch device comprising, in combination, a drive member, a driven member having a sleeve portion concentrically encircling the drive member and having an inside radius such that an annular space separates the sleeve portion from the driving member, a pawl in said annular space, a boss on the inside peripheral surface of said sleeve portion forming a pivot for one end of said pawl permitting the free end thereof to swing inwardly toward the drive member or away therefrom, means on said drive member adapted to engage the free end of said pawl when the latter is swung inwardly thereto and thereby couple the driven member for joint rotation therewith, said sleeve portion of the driven member having an opening through the side thereof adjacent to said pawl, a single flexible blade fixed at one end to sleeve portion and having its other end engaging said free end of said pawl, said blade acting to releasably hold said pawl in either engagement with said driving member or away therefrom in disengaged position, and a manual control member in said opening operatively connected to said pawl and rockingly supported for movement about said pivot.

5. A one-way clutch device comprising, in combination, a drive member, a driven member having a sleeve portion concentrically encircling the drive member and having an inside radius such that an annular space is formed between the sleeve portion and the driving member, a pawl in said annular space, a boss on the inside surface of said sleeve forming a pivot for one end of said pawl permitting the free end thereof to swing inwardly toward said driving member and outwardly away therefrom, means on said driving member adapted in one direction of its rotation to engage the free end of said pawl when swung inwardly thereto and couple the driven member for joint rotation, a single flexible blade fixed at one end to said sleeve portion and having its other end engaging the free end of said pawl, said blade acting to releasably hold said pawl in engagement with said driving member or away therefrom in disengaged position, said sleeve portion having a slot in the side thereof adjacent to said pawl extending on either side of said pivot, and a manual control element forming part of said pawl and protruding through said slot to the outside of said sleeve, said element extending on either side of said pivot whereby it may be rocked thereabout to effect movement of said pawl.

6. A one-way clutch device comprising, in combination, a drive member, a driven member having a sleeve portion concentrically encircling the drive member and having an inside radius such that an annular space is formed between the sleeve portion and the driving member, a pawl in said annular space, a boss on the inside surface of said sleeve forming a pivot for one end of said pawl permitting the free end thereof to swing inwardly toward said driving member and outwardly away therefrom, means on said driving member adapted in one direction of its rotation to engage the free end of said pawl when swung inwardly thereto and couple the driven member for joint rotation, a single flexible blade fixed at one end to said sleeve portion and having its other end engaging the free end of said pawl, said blade acting to releasably hold said pawl in engagement with said driving member or away therefrom in disengaged position, said sleeve portion having a circumferentially elongated slot in the side thereof overlying said pawl and extending on either side of said pivot, and a manual control member for said pawl protruding through said slot and occupying substantially the entire area thereof, said control member by virtue of the location of said pivot having a rocking movement thereabout capable of swinging said pawl either into engagement with said driving member or out of engagement therewith.

7. A one-way clutch device comprising, in combination, a drive member, a driven member having a sleeve portion concentrically encircling said drive member and having an inside radius such that an annular space is formed between the sleeve portion and the drive member, a pawl in said annular space, said sleeve portion having a circumferentially elongated slot through the side thereof overlying said pawl, means on said driven member pivotally mounting said pawl for movement inwardly toward the drive member for engagement therewith and outwardly away therefrom, means releasably holding said pawl in either its inward engaged position or in an outward disengaged position, said pivot having its axis extending transversely to said slot and substantially mid-way between the opposite ends thereof, and a member protruding through said slot having a dimension substantially occupying the area thereof, said member operatively connected to said pawl and adapted upon rocking movement about said pivotal axis to urge the pawl either inwardly into engagement with said drive member or outwardly away therefrom.

8. A one-way clutch device comprising, in combination, a drive member, a driven member having a sleeve portion concentrically encircling said drive member and having an inside radius such that an annular space is formed between the sleeve portion and the drive member, said sleeve portion having a circumferentially elongated slot through the side thereof, a pair of bosses carried by said driven member in said annular space on either side of said slot and shaped to provide a pivotal mounting whose axis extends parallel to the axis of the drive member and substantially midway between the ends of the slot, a control member extending through said slot having a lateral extension on either side thereof bearing on the pivotal mounting formed by said bosses and providing rocking movement of the member thereabout, said control member having a portion in said annular space shaped in the form of a detent for engaging said drive member to receive driving impulses therefrom, a single flexible metallic blade fixed at one end to the sleeve portion of said driven member and at the other end to the detent portion of said control member and adapted to releasably hold the control member in one position engaging said drive member and in another position completely disengaged therefrom, said control member protruding through said slot to the outside of the sleeve portion of said driven member and having its exposed exterior shaped such that the sections of the control member on either side of said pivotal axis are alternately raised above the outside periphery of the sleeve portion and depressed to at least the level of said periphery as the control member is rocked about its pivotal mounting.

9. In a one-way clutch device having concentrically mounted drive and driven members and a detent for operatively coupling the two members together for joint rotation, a control member for said detent operable through the side of one of said drive or driven members mounted for rocking movement about an axis parallel to that of the drive member and adapted in one position of its rocking movement to cause said detent to couple the drive and driven members together for joint rotation and in another position of its rocking movement to disengage the detent from such coupling action, said control member having its exposed exterior shaped such that the two sections thereof on opposite sides of said pivotal axis are alternately raised above said side through which the control member operates and depressed to at least the level of said side as the control member is rocked about its pivotal mounting.

MADEL A. BORDELON.

REFERENCES CITED

The following references are of record in the file of this patent:

UNITED STATES PATENTS

| Number | Name | Date |
|---|---|---|
| 140,982 | Williams | July 15, 1873 |
| 803,024 | Steitz | Oct. 31, 1905 |